3,321,264
FOUR ELEMENT INFRARED OBJECTIVE
Hendrik K. Sijgers, Billerica, and Adriaan Walther, Waltham, Mass., assignors to Diffraction Limited Corporation, Inc., Bedford, Mass., a corporation of Massachusetts
Filed June 5, 1963, Ser. No. 285,687
2 Claims. (Cl. 350—2)

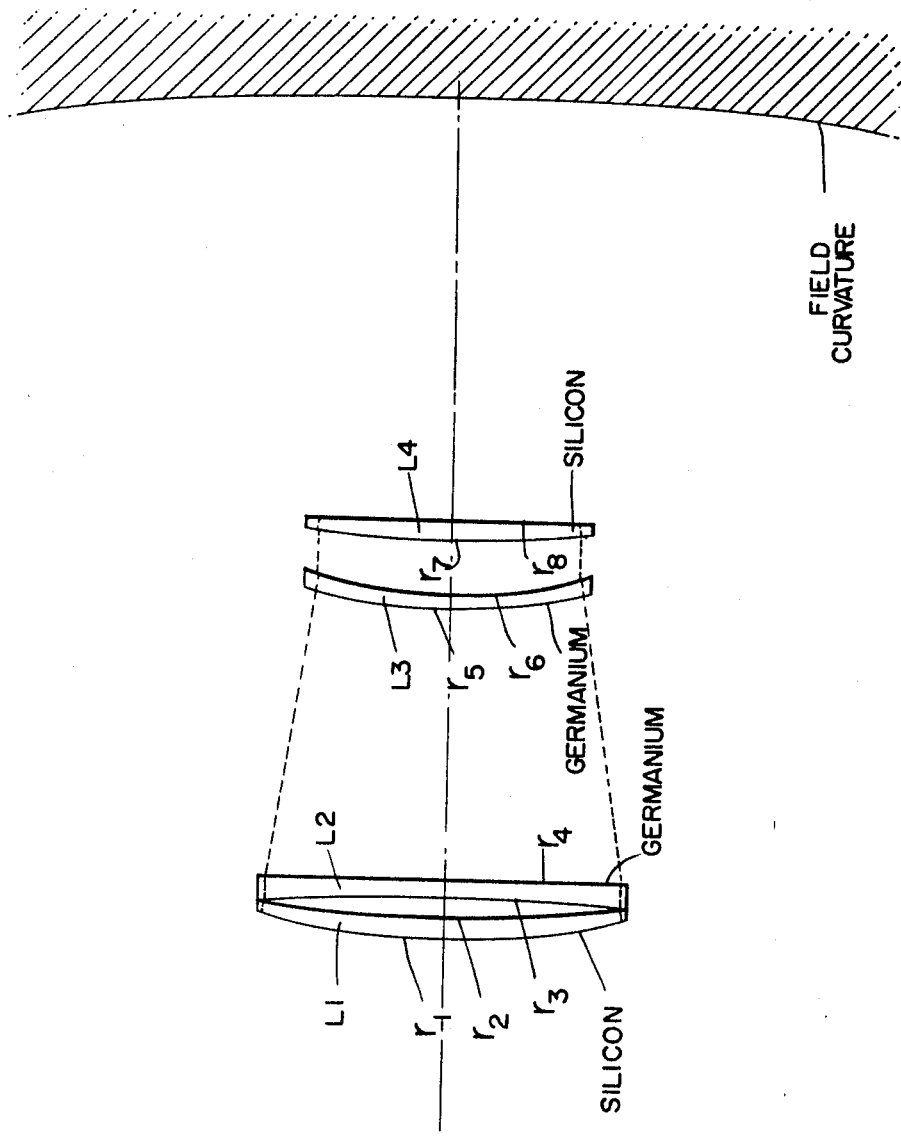

The present invention relates to infrared optics and, more particularly, to a novel infrared lens system that combines large aperture, moderate depth of field, long focal length, high resolution and small field curvature in an unprecedented way.

The primary object of the present invention is to provide a novel infrared lens system of the foregoing type comprising a particular combination of silicon and germanium lens elements having particular relationships among their radii. The particular combination of silicon and germanium materials has been found to effectively minimize coma, astigmatism and spherical aberration, and both lateral and axial chromtic aberration.

Other objects of the present invention will in part be obvious and will in part appear hereinafter.

For a full understanding of the nature of the present invention, reference is to be had to the following detailed description taken in connection with the accompanying drawing. The scope of the present invention will be indicated in the appended claims.

With reference now to the drawing, the illustrated lens system, generally designated 10, comprises a forward assemblage 12 and a rearward assemblage 14. Forward assemblage 12 includes positive and negative lens elements $L_1$ and $L_2$, composed of silicon and germanium respectively. Rearward assemblage 14 includes negative and positive lens elements $L_3$ and $L_4$, composed of germanium and silicon, respectively. The germanium and silicon both are of optical quality.

Lens $L_1$ is shown as having forward and rearward radii $r_1$ and $r_2$, respectively. Lens $L_2$ is shown as having forward and rearward radii $r_3$ and $r_4$, respectively. Lens $L_3$ is shown as having forward and rearward radii $r_5$ and $r_6$, respectively. Lens $L_4$ is shown as having forward and rearward radii $r_7$ and $r_8$, respectively. The thicknesses of $L_1$, $L_2$, $L_3$ and $L_4$ are designated $t_1$, $t_2$, $t_3$ and $t_4$, respectively. The distance between lenses $L_1$ and $L_2$ is designated $d_1$, the distance between lenses $L_2$ and $L_3$ is designated $d_2$ and the distance between lenses $L_3$ and $L_4$ is designated $d_3$.

Generally, in a lens system embodying the present invention, the relationships among the lens elements are such that:

(1) $\quad 0.6f' < r_1,\ r_5,\ r_6 < 1.25f'$ (2) $\quad 1.2f' < r_2,\ r_7 < 3.0f'$ (3) $\quad 3.0f' < r_3,\ r_4,\ r_8$ and (4) $\quad 0.3f' < d_2 < 0.6f'$ Preferably:

(5) $\quad d_1 < 0.1f'$ and (6) $\quad d_3 < 0.1f'$ where $f'$ is the focal length of the lens system.

The foregoing equations, which are the design result of initial infrared lens specifications and successive ray tracing approximations, define optimum ranges outside of which the lens system would become unacceptable to persons skilled in the art. In other words, the skill of the lens designer having been exercized by his selection of lens materials and configurations, the foregoing numerical values have resulted as an optimum compromise in the minimization of coma, astigmatism, spherical aberration and both lateral and axial chromatic aberration.

The following specific examples list representative numerical values for radii, thicknesses and distances for systems embodying the present invention.

Example I

In the following objective lens system, $f'=1$, the wavelength region is $2.5-4\mu$ and beyond and the field angle is at least $\pm 8°$.

| Lens Element | Radius | Thickness and Spacing |
|---|---|---|
| $L_1$ | $r_1=1.087$ | $t_1=0.030$ (Si) |
|  | $r_2=1.703$ | $d_1=0.037$ (Air) |
| $L_2$ | $r_3=4.81$ | $t_2=0.024$ (Ge) |
|  | $r_4=10.6$ | $d_2=0.438$ (Air) |
| $L_3$ | $r_5=0.970$ | $t_3=0.021$ (Ge) |
|  | $r_6=0.803$ [1] | $d_3=0.088$ (Air) |
| $L_4$ | $r_7=1.700$ | $t_4=0.030$ (Si) |
|  | $r_8=13.5$ |  |

[1] Approximately.

All radii, except the third and fourth, are positive. The signs are defined as follows: if an arrow drawn from the vertex of a surface to its center of curvature points toward the image, the sign of the radius is $+$. If this arrow points toward the object, the sign of the radius is $-$.

Example II

In the following objective lens system the data are normalized to make the focal length of the lens equal to 1, and the wavelength region is $2.5-4\mu$ and beyond.

| Lens Element | Radius | Thickness and Spacing |
|---|---|---|
| $L_1$ | $r_1=1.09$ | $t_1=0.03$ (Si) |
|  | $r_2=1.70$ | $d_1=0.04$ (Air) |
| $L_2$ | $r_3=4.90$ | $t_2=0.03$ (Ge) |
|  | $r_4=11.00$ | $d_2=0.44$ (Air) |
| $L_3$ | $r_5=0.95$ | $t_3=0.02$ (Ge) |
|  | $r_6=0.80$ | $d_3=0.09$ (Air) |
| $L_4$ | $r_7=1.70$ | $t_4=0.03$ (Si) |
|  | $r_8=13.0$ |  |

In the foregoing system, the focal length may be chosen as large as 20 inches, the field curvature is 2.7 times the focal length, the F number$=F/1.5$ and the field angle is $\pm 10°$. All radii, except the third and fourth, are positive. The signs are defined as follows. If an arrow drawn from the vertex of a surface to its center of curvature points toward the image, the sign of the radius is $+$. If this arrow points toward the object, the sign of the radius is $-$.

The present invention thus provides an infrared lens system having unique freedom from aberration and distortion. Since certain changes may be made in the above devices without departing from the scope of the invention herein involved, it is intended that all matter contained in the above description or shown in the accompanying drawing shall be interpreted in an illustrative and not in a limiting sense.

What is claimed is:

1. An infrared lens system comprising a forward assemblage and a rearward assemblage, said forward assemblage including a lens $L_1$ composed of silicon and a lens $L_2$ composed of germanium, said rearward assemblage including a lens $L_3$ composed of germanium and a lens $L_4$ composed of silicon, said lens $L_1$ having forward and rearward radii $r_1$ and $r_2$, respectively, said lens $L_2$ having forward and rearward radii $r_3$ and $r_4$, respectively, said lens $L_3$ having forward and rearward radii $r_5$ and $r_6$, respectively, said lens $L_4$ having forward and rearward radii $r_7$ and $r_8$ respectively, the thickness of said lenses $L_1$, $L_2$, $L_3$, and $L_4$ being designated by $t_1$, $t_2$, $t_3$ and $t_4$, respectively, the distances between said lenses $L_1$ and $L_2$ being designated $d_1$, the distance between said lenses $L_2$ and $L_3$ being designated by $d_2$, the distance between said lenses $L_3$ and $L_4$ being designated by $d_3$, the relationships among said lenses being approximately such that, considering the focal length $f$ as being equal to 1, $r_1$, $r_2$, $r_5$, $r_6$, $r_7$, $r_8$, as being positive, and $r_3$ and $r_4$ as being negative:

| Lens Element | Radius | Thickness and Spacing |
|---|---|---|
| $L_1$ | $r_1=1.087$ | $t_1=0.030$ (Si) |
| | $r_2=1.703$ | $d_1=0.037$ (Air) |
| $L_2$ | $r_3=4.81$ | $t_2=0.024$ (Ge) |
| | $r_4=10.6$ | |
| | | $d_2=0.438$ (Air) |
| $L_3$ | $r_5=0.970$ | $t_3=0.021$ (Ge) |
| | $r_6=0.803$ [1] | |
| | | $d_3=0.088$ (Air) |
| $L_4$ | $r_7=1.700$ | $t_4=0.030$ (Si) |
| | $r_8=13.5$ | |

[1] Approximately.

2. An infrared lens system comprising a forward assemblage and a rearward assemblage, said forward assemblage including a lens $L_1$ composed of silicon and a lens $L_2$ composed of germanium, said rearward assemblage including a lens $L_3$ composed of germanium and a lens $L_4$ composed of silicon, said lens $L_1$ having forward and rearward radii $r_1$ and $r_2$, respectively, said lens $L_2$ having forward and rearward radii $r_3$ and $r_4$, respectively, said lens $L_3$ having forward and rearward radii $r_5$ and $r_6$, respectively, said lens $L_4$ having forward and rearward radii $r_7$ and $r_8$ respectively, the thicknesses of said lenses $L_1$, $L_2$, $L_3$ and $L_4$ being designated by $t_1$, $t_2$, $t_3$, and $t_4$, respectively, the distances between said lenses $L_1$ and $L_2$ being designated $d_1$, the distance between said lenses $L_2$ and $L_3$ being designated by $d_2$, the distance between said lenses $L_3$ and $L_4$ being designated by $d_3$, the relationships among said lenses being approximately such that, considering the focal length $f$ as being equal to 1, $r_1$, $r_2$, $r_5$, $r_6$, $r_7$, $r_8$ as being positive, and $r_3$ and $r_4$ as being negative:

| Lens Element | Radius | Thickness and Spacing |
|---|---|---|
| $L_1$ | $r_1=1.09$ | $t_1=0.03$ (Si) |
| | $r_2=1.70$ | $d_1=0.04$ (Air) |
| $L_2$ | $r_3=4.90$ | $t_2=0.03$ (Ge) |
| | $r_4=11.00$ | |
| | | $d_2=0.44$ (Air) |
| $L_3$ | $r_5=0.95$ | $t_3=0.02$ (Ge) |
| | $r_6=0.80$ | |
| | | $d_3=0.09$ (Air) |
| $L_4$ | $r_7=1.70$ | $t_4=0.03$ (Si) |
| | $r_8=13.0$ | |

References Cited by the Examiner

UNITED STATES PATENTS 2,407,347  9/1946  Sachtleben _____ 88—57
2,659,271  11/1953  Treuting.

FOREIGN PATENTS 396,359  6/1924  Germany.
117,978  7/1957  Russia.

JEWELL H. PEDERSEN, *Primary Examiner.*
JOHN K. CORBIN, *Examiner.*